(12) United States Patent
Tostado et al.

(10) Patent No.: US 9,534,587 B2
(45) Date of Patent: Jan. 3, 2017

(54) BACKDRIVE ASSEMBLY WITH A VARIABLE PRELOAD

(71) Applicants: Carlos I. Tostado, Chihuahua (MX); Donald Michael Perkins, Sterling Heights, MI (US)

(72) Inventors: Carlos I. Tostado, Chihuahua (MX); Donald Michael Perkins, Sterling Heights, MI (US)

(73) Assignee: INTEVA PRODUCTS, LLC, Troy, MI (US)

(*) Notice: Subject to any disclaimer, the term of this patent is extended or adjusted under 35 U.S.C. 154(b) by 76 days.

(21) Appl. No.: 14/542,569

(22) Filed: Nov. 15, 2014

(65) Prior Publication Data

US 2015/0136528 A1     May 21, 2015

Related U.S. Application Data

(60) Provisional application No. 61/904,778, filed on Nov. 15, 2013.

(51) Int. Cl.
*F03G 1/00*      (2006.01)
*H02K 33/02*     (2006.01)

(52) U.S. Cl.
CPC ............ *F03G 1/00* (2013.01); *H02K 33/02* (2013.01); *Y10T 29/49826* (2015.01)

(58) Field of Classification Search
CPC ........ H02K 33/00; H02K 33/02; H02K 33/04; H02K 33/10; H02K 33/12; H02K 33/14; H02K 33/16; H02K 33/18; A63H 29/02; A63H 29/04; A63H 29/24; E05B 47/00; E05B 47/0001; E05B 47/0002; E05B 47/0012; E05B 2047/0035; E05B 2047/0036; E05B 2047/0037; F03G 1/00; F03G 1/02; F03G 1/06; F03G 1/08; F03G 2730/01; F03G 2730/02; F03G 2730/03; F03G 2730/07
See application file for complete search history.

(56) References Cited

U.S. PATENT DOCUMENTS

| | | | | | |
|---|---|---|---|---|---|
| 382,033 | A | * | 5/1888 | Dohis | F03G 1/00 185/39 |
| 440,482 | A | * | 11/1890 | Lee et al. | F03G 1/00 185/39 |
| 895,308 | A | * | 8/1908 | Schaar | F03G 1/00 185/40 R |
| 1,118,207 | A | * | 11/1914 | Larson | F03G 1/00 123/185.14 |
| 1,267,423 | A | * | 5/1918 | Kunkle | F03G 1/00 185/37 |

(Continued)

*Primary Examiner* — Alan B Waits
(74) *Attorney, Agent, or Firm* — Cantor Colburn LLP (57) ABSTRACT

A system is disclosed herein. The system having a backdrive assembly that includes a spring body retainer having a first body portion, the spring body retainer configured for rotational movement about an axis. A biasing member is provided that is configured to exert a backdriving force on the spring body retainer. A spring leg retainer is provided having a second body portion and a plurality of projections, the spring leg retainer being configured to incrementally apply a preload torque to the biasing member. A spring locking plate is operably connected to the spring leg retainer, the spring locking plate being configured to engage at least one of the plurality of projections.

20 Claims, 4 Drawing Sheets

(56) References Cited

U.S. PATENT DOCUMENTS

| | | | | | |
|---|---|---|---|---|---|
| 1,491,973 | A | * | 4/1924 | Seiler | F03G 1/00 |
| | | | | | 185/45 |
| 4,113,062 | A | * | 9/1978 | Beland | B60R 22/44 |
| | | | | | 242/372 |
| 4,595,081 | A | * | 6/1986 | Parsons | F03G 1/08 |
| | | | | | 185/40 R |
| 5,310,021 | A | * | 5/1994 | Hightower | F24F 13/1426 |
| | | | | | 185/40 R |
| 5,434,487 | A | * | 7/1995 | Long | E05F 15/75 |
| | | | | | 318/280 |
| 5,628,535 | A | * | 5/1997 | Buscher | E05B 81/25 |
| | | | | | 292/144 |
| 6,679,356 | B2 | * | 1/2004 | Hageman | F16D 65/18 |
| | | | | | 185/40 A |
| 6,725,976 | B2 | * | 4/2004 | Oh | F16K 1/223 |
| | | | | | 185/39 |
| 7,066,301 | B2 | * | 6/2006 | Oh | F16K 1/223 |
| | | | | | 185/11 |
| 8,575,872 | B2 | * | 11/2013 | Mullet | H02P 3/08 |
| | | | | | 160/133 |
| 9,194,179 | B2 | * | 11/2015 | Mullet | E06B 9/40 |
| 2012/0091740 | A1 | * | 4/2012 | Chevalier | E05B 81/14 |
| | | | | | 292/226 |

* cited by examiner

US 9,534,587 B2
BACKDRIVE ASSEMBLY WITH A VARIABLE PRELOAD

CROSS REFERENCE TO RELATED APPLICATIONS

This application claims the benefit of U.S. Provisional Patent Application Ser. No. 61/904,778 filed Nov. 15, 2013, the entire contents of which are incorporated herein by reference thereto.

FIELD OF THE INVENTION

This invention relates generally to a backdrive assembly and more specifically to a backdrive assembly with a biasing member having a variable preload operably connected to a motor shaft and gears for backdriving a mechanism connected thereto.

BACKGROUND OF THE INVENTION

Backdrive assemblies are used to return a mechanism connected to the assembly back to an initial position after being actuated. For example, a backdrive assembly may be used with a motor shaft, gear trains, or levers such as, for example, a vehicle door latch. The backdrive assembly includes a torsion spring that may be connected to and rotates, for example, a gear that back drives a complementary nut attached thereto by exerting a proportional and opposite twisting force to the gear. Convention backdrive assemblies that use torsion springs are not easy to assemble into the gear and/or the nut with a pre-load. These springs are assembled with the mechanism and must be twisted to create a specific torsion load. These springs may lose their pre-winding loads after removal of the assembly fixture from the mechanism. Typical issues include the springs popping up from the gear/nut, losing turns, or legs of the torsion spring disconnecting from the gear and/or nut.

Accordingly, it is desirable to provide a backdrive arrangement with a variable bias preload during manufacturing of the system. More specifically, it is desirable to provide a backdrive arrangement that employs a variable preload feature for retaining the backdrive biasing member to the assembly at a defined preload while at a rest position.

SUMMARY OF THE INVENTION

In accordance with an exemplary embodiment of the invention, a backdrive assembly is provided. The backdrive assembly includes a spring body retainer having a first body portion, the spring body retainer configured for rotational movement about an axis. A biasing member is provided that is configured to exert a backdriving force on the spring body retainer. A spring leg retainer is provided having a second body portion and a plurality of projections, the spring leg retainer being configured to incrementally apply a preload torque to the biasing member. A spring locking plate is operably connected to the spring leg retainer, the spring locking plate being configured to engage at least one of the plurality of projections.

In accordance with another exemplary embodiment, a system is provided. The system includes a motor drive system including a motor coupled to a shaft. A backdrive assembly is operably coupled to the motor drive system, the backdrive assembly configured for exerting a backdriving force to the shaft of the motor. The backdrive assembly further comprises a spring body retainer having a first body portion, the spring body retainer capable of rotational movement. A biasing member that is configured to exert the backdriving force on the spring body retainer. A spring leg retainer is arranged opposite the spring body retainer, the spring leg retainer having a second body portion and a plurality of projections, the spring leg retainer being configured to incrementally apply a preload torque to the biasing member. A spring locking plate is operably connected to the spring leg retainer, the spring locking plate being configured to engage at least one of the plurality of projections.

In accordance with another exemplary embodiment, a method of assembling a system is provided. The method includes coupling a motor to a spring body retainer. A biasing member is coupled to the spring body retainer. A spring leg retainer is coupled to the biasing member. The biasing member is fixably connected to each of the spring body retainer and the spring leg retainer. A spring locking plate is coupled to the spring leg retainer to form an assembly. The assembly is inserted into a housing and preventing rotation of the spring locking plate. Each of the motor and the spring body retainer are rotated with a predefined rotation. The spring leg retainer is rotated with a second predefined rotation.

Additional features and advantages of the various aspects of exemplary embodiments of the present invention will become more readily apparent from the following detailed description in conjunction with the drawings wherein like reference numerals refer to corresponding parts in the several views.

Although the drawings represent varied embodiments and features of the present invention, the drawings are not necessarily to scale and certain features may be exaggerated in order to illustrate and explain exemplary embodiments the present invention. The exemplification set forth herein illustrates several aspects of the invention, in one form, and such exemplification is not to be construed as limiting the scope of the invention in any manner.

DETAILED DESCRIPTION OF EXEMPLARY EMBODIMENTS

Exemplary embodiments of the invention relate to a system that includes a motor drive system and a backdrive assembly. The backdrive assembly includes a biasing member that has a variable preload applied to it after assembly of the system. The biasing member maintains a preload during an initial or rest position of the system. Also disclosed is a method of assembling the system in order to apply a controlled and defined preload to the backdrive assembly and maintain the preload torque on the biasing member without a risk of disassembly of the biasing member or losing a preload torque on the system at an initial or rest position.

Figure 1:
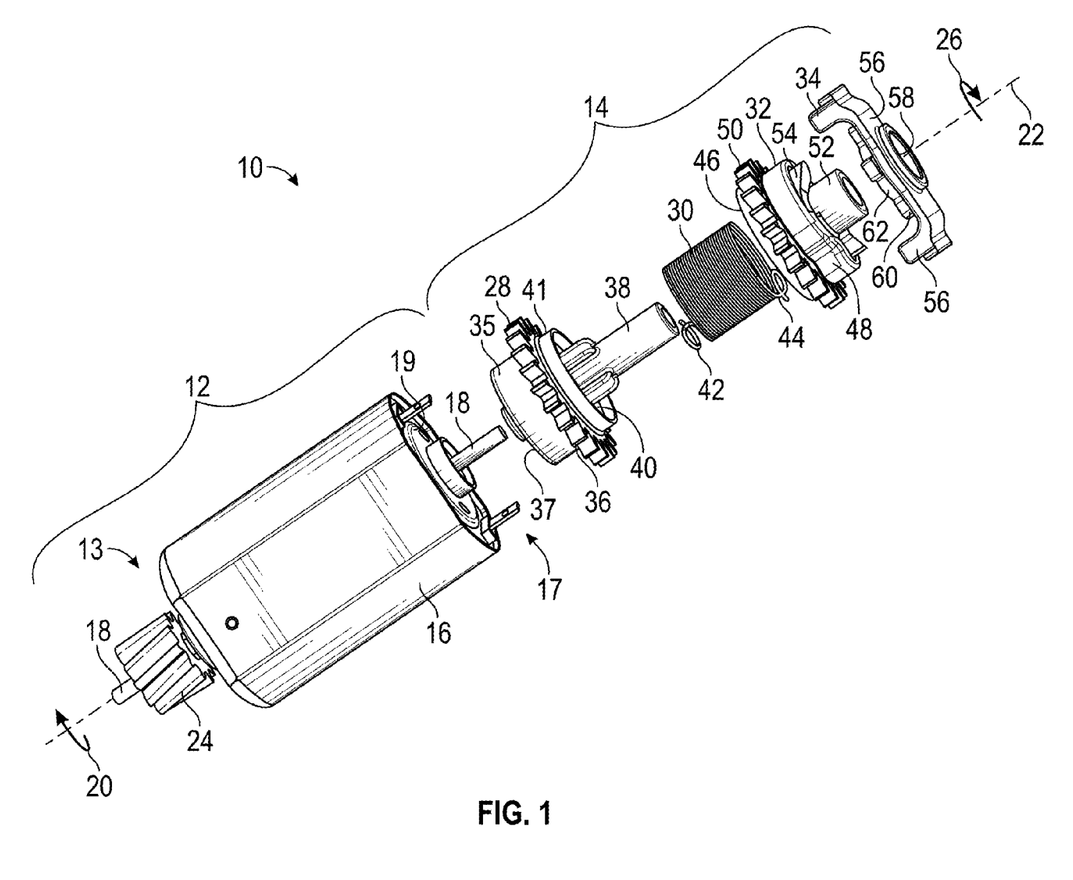
FIG. 1 is an exploded perspective view illustrating a backdrive assembly coupled to a motor assembly according to an exemplary embodiment of the invention.

Referring now to the drawings, a system 10 is illustrated in FIG. 1 according to an exemplary embodiment of the present invention. In one embodiment, the system 10 may be used to drive components of a device or other system between at least two different positions. Still further, the system 10 may be configured for use in a vehicle latch. The system 10 includes a motor drive system 12 at a proximal end 13 that is operably coupled to a backdrive assembly 14 at a distal end 17 of the motor drive system 12. In an embodiment, the system 10 may be installed in a vehicle latch or other systems where it is desirable to drive a component with the motor drive system and backdrive and/or return the motor drive system to its initial position such that the motor drive system as well as components operably coupled to or being driven by the motor drive system are returned to their initial state without having to electrically operate or backdrive the motor drive system in an opposite direction.

As illustrated in FIG. 1, motor drive system 12 has a motor 16 that drives rotation of a motor shaft 18 in a first rotational direction 20 for example. It being understood that the motor 16 is capable of being back driven. The motor shaft 18 is aligned along a longitudinal axis 22 and in one non-limiting embodiment is coupled to a helical gear 24. The helical gear 24 may be rotated in a second rotational direction 26 by, in one example, the back drive assembly 14, which back drives the motor shaft 18 in the second rotational direction 26 along longitudinal axis 20 in order to return the system 10 to a rest or initial position. As shown in FIG. 1, the first and second rotational directions 20, 26 are illustrated as being in a clockwise rotational direction (CW) and a counterclockwise rotational direction (CCW) respectively, however in another non-limiting embodiment, the motor drive system 12 may be configured to be rotated and back driven in opposite directions to those shown and illustrated in FIG. 1.

Figure 3A:
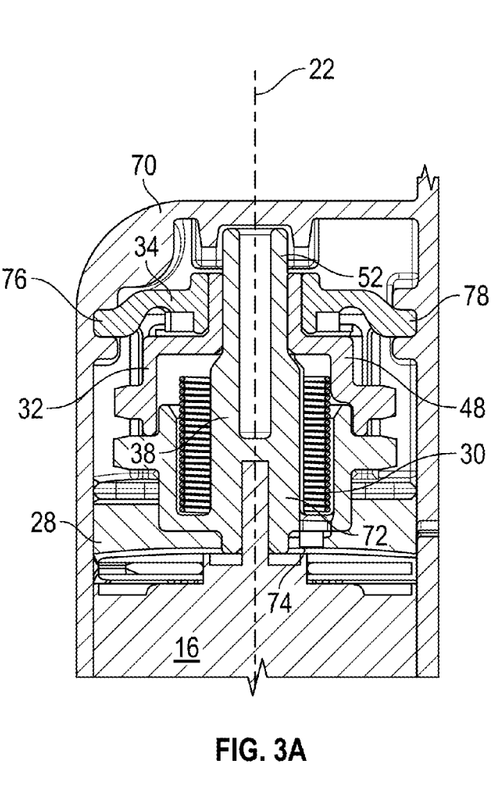
FIG. 3A is a cross-sectional view of the backdrive assembly.
Figure 3B:
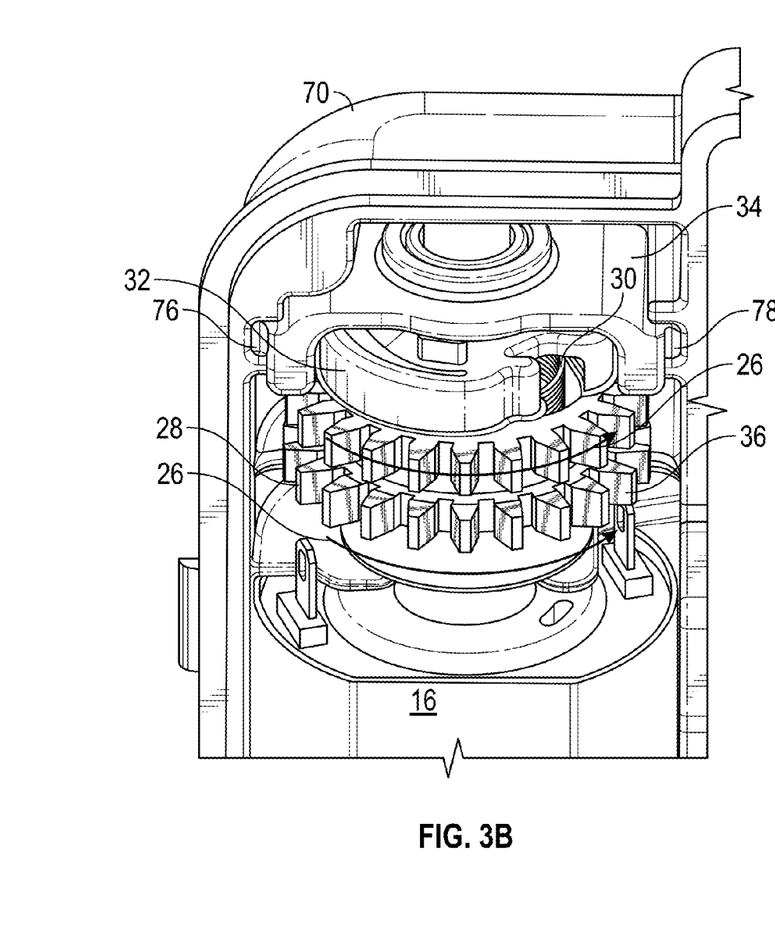
FIGS. 3B-3D are perspective views illustrating movement of the backdrive assembly according to an embodiment of the invention.

The motor drive system 12 is rotationally coupled to a backdrive assembly 14 at a top surface 19 of motor 16. The backdrive assembly 14 includes a spring body retainer 28, a biasing member 30, a spring leg retainer 32, and a spring locking plate 34. The spring body retainer 28 is rotationally mounted to the system 10 as well as the backdrive assembly 14 for rotation about axis 22 in both the CW direction 20 and the CCW direction 26. The spring leg retainer 32 is also rotationally mounted to the system 10 as well as the backdrive assembly 14 for rotation about axis 22 in a CCW direction 26 however and as will be discussed below and when assembled rotation of the spring leg retainer in the CW direction 20 is prevented due to protrusions 54 engaging blocking features 60 in order to provide a preload torque to spring 30 as well as the backdrive assembly 14. The spring body retainer 28 is generally cylindrical in shape from proximal end 37 to elongated cylindrical portion 38. The proximal end 37 engages with shaft 18 of motor 16 and is thus rotationally driven by the motor 16 as shaft 18 is rotated. The spring body retainer 28 also includes a generally cylindrical body portion 35, a spur gear 36 formed in body portion 35 and the generally elongated cylindrical portion 38 that emanates from a cavity 40 at a distal end 41 of the body portion 35. The cavity 40 has an internal diameter that is conformally sized to axially receive a portion of the biasing member 30. Further, a through-bore 72 (FIG. 3A) traverses spring body retainer from proximal end 37 to cylindrical portion 38. The through-bore 72 is sized to receive and engage motor shaft 18 during assembly as will be shown and described below with reference to FIGS. 3A-3E. Moreover, motor shaft 18 is operatively coupled to spring body retainer 28 such that as shaft 18 rotates so does spring body retainer 28 and vice versa.

In one non-limiting embodiment, the biasing member 30 is a helical torsion and compression combination spring or simply a torsion spring 30 configured to exert a backdriving force on the spring body retainer 28. The biasing member 30 includes a lower leg 42 that is selectively and fixably connected to the body portion 35 within cavity 40 and an upper leg 44 that is selectively and fixably coupled to a proximal end 46 of spring leg retainer 32. The spring leg retainer 32 is also generally cylindrical in shape and has a body portion 48, a spur gear 50 formed circumferentially on an outer surface of body portion 48 and a generally elongated cylindrical portion 52 that extend axially from body portion 48 along longitudinal axis 22. The body portion 48 has an internal cavity or bore on the proximate end 46 with a first diameter which is sized to receive an external diameter of biasing member 30 and also receive a distal end 41 of spring body retainer 28. The body portion 48 has a pair of projections 54 that are circumferentially located at a distal end of body portion 48. The projections 54 are constructed to allow only rotation along a CCW rotational direction 26 of spring leg retainer 32 with the biasing member 30. The spring leg retainer 32 terminates into a spring locking plate 34. The spring locking plate 34 has a generally C-shaped cross-sectional body portion 56 with a through bore 58 for rotationally receiving elongated cylindrical portion 52 of spring leg retainer 32, a plurality of substantially similar blocking features 60 circumferentially provided at a proximal portion 62 and a raised lip 64 at its distal end. As illustrated, four blocking features 60 are shown and illustrated, however, additional blocking features 60 may be provided equally spaced at the proximal end. The blocking features 60 interact with the projections 54 and facilitate rotation along a CCW rotational direction 26 of the spring leg retainer 32 and biasing member 30 while preventing rotation along a CW rotational direction 20 of the spring leg retainer 32 and upper leg 44 of biasing member 30 when assembled into the motor drive system 12.

Figure 2:
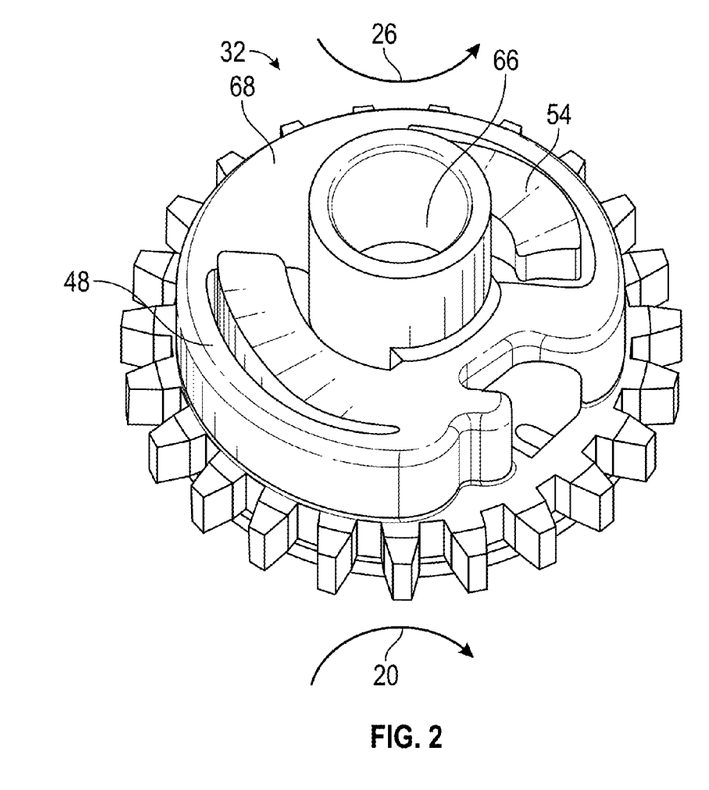
FIG. 2 is a perspective view illustrating the spring leg retainer in the assembly of FIG. 1 according to an exemplary embodiment.

FIG. 2 provides an enlarged perspective view of spring leg retainer 32. As illustrated, spring leg retainer 32 is generally cylindrical in shape and includes a through bore 66 that traverses body portion 48. A plurality of projections 54 extend from a distal end of body portion 48 and are formed to allow only rotation along a CCW rotational direction 26 of spring leg retainer 32. The projections 54 are generally arcuate in shape and taper upwards from a top land 68 toward spring locking plate 34 (FIG. 1). The projections 54 are configured to allow only rotation along a CCW rotational direction 26 of spring leg retainer 32 along a direction of arrow 26 and are restrained from rotation along a CW rotational direction 20 by the blocking features 60 of spring locking plate 34 (FIG. 1). As will be discussed herein, the CCW rotation of the spring leg retainer 32 with respect to spring body retainer 28 allows a spring preload torque to be applied to the back drive system or spring 30 after it has been installed into system 10. Thus negating the need to preload spring 30 prior to its installation in the assembly 14 or system 10, which prevents spring 30 from becoming misaligned, popping out of alignment or becoming disconnected during the installation process as it is installed without a preloaded torque or biasing force on spring 30.

With reference to FIGS. 1 and 3A-3D, system 10 may be assembled by selectively connecting the motor drive system 12 to the backdrive assembly 14 outside a housing 70 without a need for pre-winding the biasing member 30 prior to assembly, which aids in the assembly process. Particularly, the motor 16 is coupled to the spring body retainer 28 by inserting the motor shaft 18 emanating from a top surface 19 into through-bore 72 such that shaft 18 engages spring body retainer 28. The through-bore 72 and motor shaft 18 are both aligned along longitudinal axis 22. Further, the biasing member 30 is connected to the spring body retainer 28 and the spring leg retainer 32 such that cylindrical portion 38 of spring body retainer 28 resides within through-bore of biasing member 30 while at the same time spring leg retainer 32 is aligned along longitudinal axis 22 and positioned over distal end 41 of spring body retainer 28. Also, lower leg 42 is attached to protrusion 74 of spring body retainer 28 and upper leg 44 is attached to body portion 48 of spring leg retainer 32 such that the biasing member 30 engages both the spring body retainer 28 and the spring leg retainer 32. At this time, the motor shaft 18, spring body retainer 28, biasing member 30, and spring leg retainer 32 are all aligned along longitudinal axis 22. Next, the spring locking plate 34 is coupled to the spring leg retainer 32 by inserting its proximal end 62 over the cylindrical portion 52 such that the cylindrical portion 52 resides within bore 58 and the entire assembly is aligned along longitudinal axis 22. The assembled system 10 is inserted into the housing 70 such that the lateral tabs 76, 78 of spring locking plate 34 are fixed in a complementary slot in housing 70 so as to contain the system 10 within the housing. The lateral tabs 76, 78 also function to restrain the spring locking plate 34 within housing 70, thereby preventing spring locking plate 34 from rotating while spring leg retainer 32 is rotated, as will be described below in reference to FIG. 3D.

Further assembly includes applying a preload torque to the biasing member 30 after it has been assembled into system 10 and/or assembly 14, in order to return the system 10 to its initial position (i.e., at rest) after actuation of the system 10 as well as maintain a preload torque on the backdrive assembly 14 at an initial or rest position of the system 10 prior to actuation. Particularly, referring to FIG. 3B and after assembly together, the motor drive system 12, the spring body retainer 28 and spring leg retainer 32 are co-rotated along a CCW rotational direction 26 until the spring body retainer 28 and motor drive system 12 are rotated until a designated stop of the system 10 is reached (e.g., an initial rest or stop position of the system 10 and/or gears or levers being driven by the system 10 is reached). Thereafter and in order to apply a preload torque to the spring 30 or backdrive assembly 14, the spring leg retainer 32 and upper leg 44 of spring 30 may be further rotated in the CCW direction 26 while movement of the spring body retainer 28, lower leg 42 and motor shaft 18 is prevented since the system is at its initial rest position or designated stop of the system has been reached. Thereafter, a calculated or predefined degree of rotation of the spring leg retainer 32 in the CCW direction 26 may be determined by a counter or any other equivalent means of measuring the rotation or pre-applied rotation and thus force to spring 30 may be used to determine and provide the preloaded torque on the spring 30 or backdrive assembly 14 and/or system 10 in a predetermined manner. In one embodiment, this pre-load prevents undesirable movement or vibration of the components of the system and/or backdrive assembly 14 as spring 30 now has a pre-loaded torque that is applied after it has been installed into the system 10 or assembly 14. The tabs 76, 78 prevent the spring locking plate from rotating in the housing 70. In an embodiment, gears that are complementary to spur gear 36 and spur gear 50 may be utilized to rotate the spring body retainer 28 and spring leg retainer 32. At this point, the system 10 is at its initial or rest position.

Figure 3C:
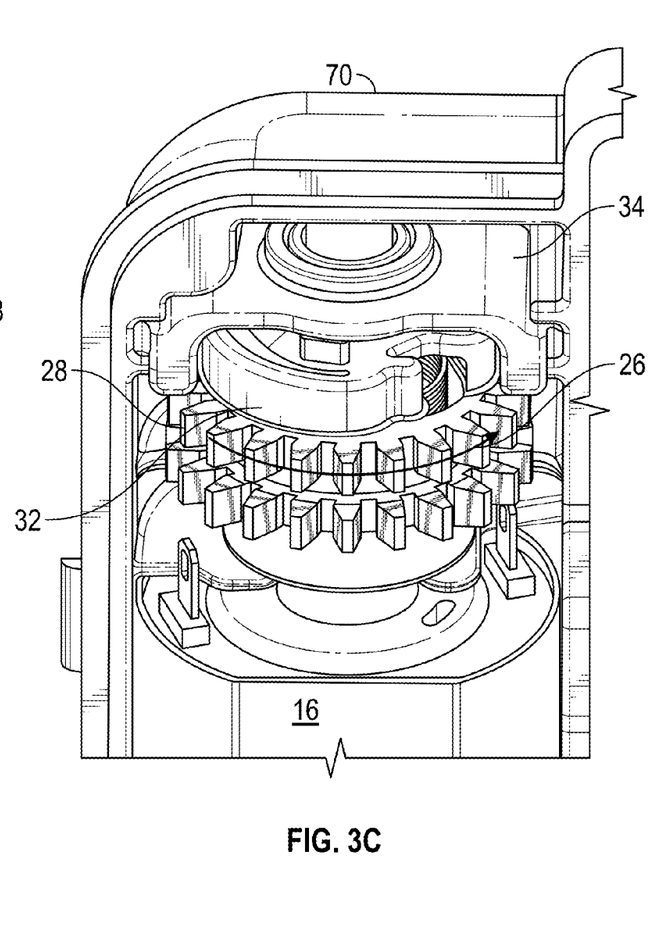
Figure 3D:
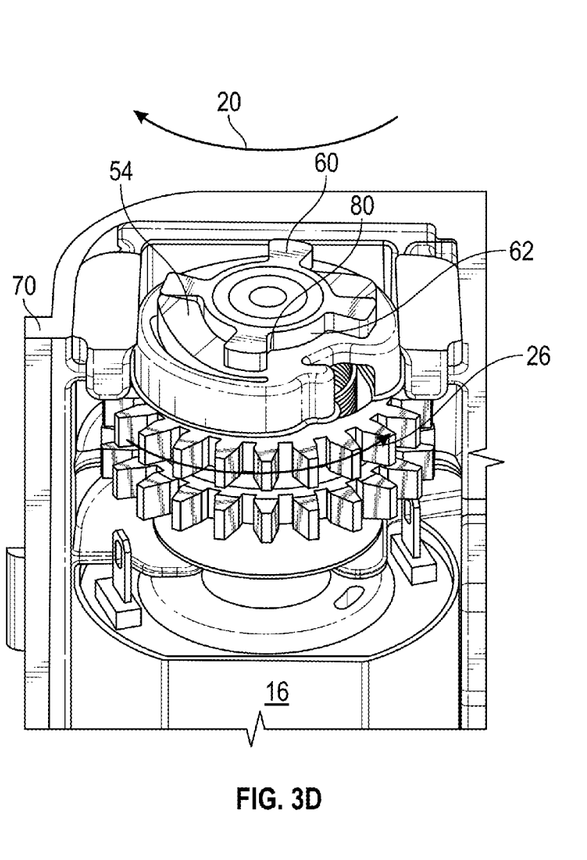

Next, referring to FIG. 3C-3D and as mentioned above, the biasing member 30 is preloaded with a torque by further rotating the spring leg retainer 32 in a CCW rotational direction 26. The spring leg retainer 32 being coupled to the upper leg 44 of the biasing member 30 that is restrained at its lower leg 42 causes the spring leg retainer 32 to apply a variable preloaded torque to the biasing member 30. The spring leg retainer 32 is rotated for a calculated or predefined degree of rotation (i.e., turns) until a predetermined preload torque is applied to the biasing member 30 through a twisting motion of the biasing member 30. As illustrated in FIG. 3D, a preloaded torque may be applied by rotating the spring leg retainer 32 such that projections 54 on the spring leg retainer 32 interact with blocking features 60 on the spring locking plate 34 to apply a variable preload on the biasing member 30. For ease of illustration of the blocking feature 60 with the projection 54, the spring locking plate 34 is shown without the body portion 56 in FIG. 3D. For each quarter (¼) turn of the spring leg retainer 32, the spring board 54 travels past a respective blocking feature 60 and engages a stop 80 defined by a vertical face of the blocking of the respective blocking feature 60. The stop 80 prevents the spring leg retainer 32 from rotating back in the CW rotational direction 20 thus maintaining the preload torque imparted on the biasing member 30 for each quarter (¼) turn of the spring leg retainer 32. The spring leg retainer 32 is thus fixed to the spring locking plate 34 and maintains its position with respect to the spring locking plate 34 once the preload torque has been applied to the system 10. To finalize assembly of the system 10, a cover is added over the housing 70 in order to shield the system 10 and further hold the assembly in place.

Figure 4:
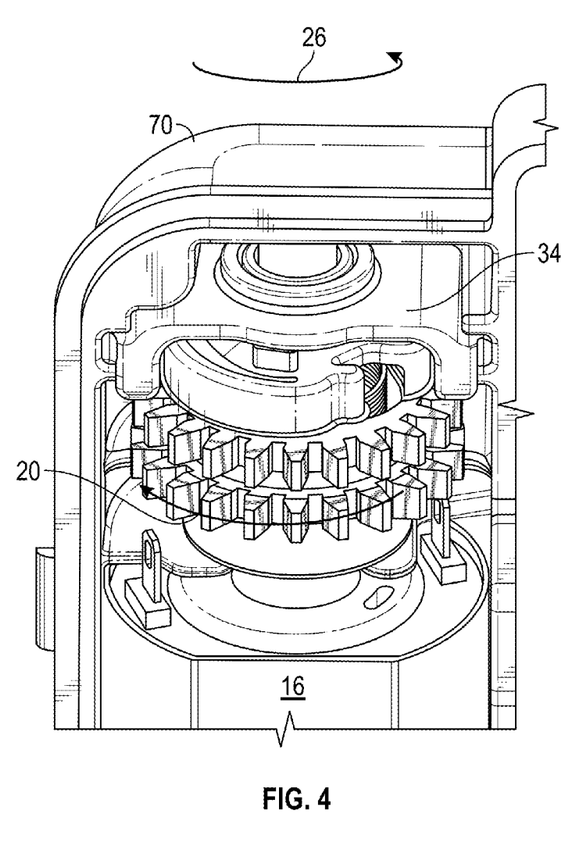
FIG. 4 is a perspective view illustrating operation of the system according to an exemplary embodiment.

Referring to FIG. 4, the system 10, including the motor drive system 12 and the backdrive assembly 14, are at an initial position and preloaded with a torque so as to prevent the biasing member 30 from losing spring turns and thus it is preloaded with a torque and ready to backdrive the system when the shaft 18 rotates in the CW direction due to a motor applied force and then the motor applied force is removed and the biasing force of spring 30 then back drives the motor shaft 18. During normal operation of the motor drive system 12, the motor shaft 18 is rotated along a CW rotational direction 20 causing the spring body retainer 28 and lower leg 42 of biasing member 30 to correspondingly rotate along a CW rotational direction 20. The spring leg retainer 32 and the spring locking plate 34 do not rotate during this CW rotation of the motor shaft 18 since upper leg 44 is secured to the spring leg retainer 32 and the projections 54 engaged features 60. The upper leg 44 being fixed to the spring leg retainer 32 causes a compressive energy to be added to the biasing member 30 as spring body retainer 28 rotates in the CW direction 20. Once the motor 12 is deenergized, this compressive energy is released thereby back driving the system 10 (e.g., gear 24, shaft 18 and spring body retainer 28) to its initial rest position through application of a compressive force on the spring body retainer 28 for rotation along a CCW rotational direction 26 in order to bring the spring body retainer 28, shaft 18 and gear 24 back to its original or rest position.

As used herein, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. In addition, it is noted that the terms "lower" and "upper" are used herein, unless otherwise noted, merely for convenience of description, and are not limited to any one position or spatial orientation.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A backdrive assembly, comprising:
    a spring body retainer having a first body portion, the spring body retainer configured for rotational movement about an axis;
    a biasing member that is configured to exert a backdriving force on the spring body retainer;
    a spring leg retainer rotatably mounted to the backdrive assembly and having a second body portion and a plurality of projections, the spring leg retainer applies a preload torque to the biasing member when the spring leg retainer is rotated; and
    a spring locking plate operably connected to the spring leg retainer, the spring locking plate preventing rotation of the spring leg retainer in a first direction by engaging at least one of the plurality of projections of the spring leg retainer and wherein the spring locking plate allows the spring leg retainer to rotate in a second direction, the second direction being opposite to the first direction.

2. The backdrive assembly as in claim 1, wherein the spring locking plate further comprises a plurality of tabs that prevent rotation of the spring locking plate in the first direction.

3. The backdrive assembly as in claim 1, wherein the biasing member comprises a lower leg and an upper leg, and wherein the lower leg is fixably connected to the spring body retainer and the upper leg that is fixably connected to the spring leg retainer.

4. The backdrive assembly as in claim 1, wherein the spring locking plate further comprises a plurality of blocking features that prevent rotation of the spring leg retainer in the first direction when one of the plurality of blocking features operably engages the at least one of the plurality of protrusions of the spring leg retainer.

5. The backdrive assembly as in claim 1, wherein the spring body retainer further comprises a first spur gear.

6. The backdrive assembly as in claim 1, wherein the spring leg retainer comprises a spur gear.

7. The backdrive assembly as in claim 1, wherein the biasing member is a helical torsion and compression combination spring.

8. A system, comprising:
    a motor drive system including a motor coupled to a shaft; and
    a backdrive assembly operably coupled to the motor drive system, the backdrive assembly configured for exerting a backdriving force to the shaft of the motor, wherein the backdrive assembly further comprises:
    a spring body retainer having a first body portion, the spring body retainer capable of rotational movement;
    a biasing member that is configured to exert the backdriving force on the spring body retainer;
    a spring leg retainer arranged opposite the spring body retainer and rotatably mounted to the backdrive assembly, the spring leg retainer having a second body portion and a plurality of projections, the spring leg retainer applies a preload torque to the biasing member when the spring leg retainer is rotated; and
    a spring locking plate operably connected to the spring leg retainer, the spring locking plate preventing rotation of the spring leg retainer in a first direction by engaging at least one of the plurality of projections and wherein the spring locking plate allows the spring leg retainer to rotate in a second direction, the second direction being opposite to the first direction.

9. The system as in claim 8, wherein the spring locking plate further comprises a plurality of tabs that prevent rotation of the spring locking plate in the first direction.

10. The system as in claim 8, wherein the biasing member comprises a lower leg and an upper leg, and wherein the lower leg is fixably connected to the spring body retainer and the upper leg that is fixably connected to the spring leg retainer.

11. The system as in claim 8, wherein the spring locking plate further comprises a plurality of blocking features that prevent rotation of the spring leg retainer in the first direction when one of the plurality of blocking features engages at least one of the plurality of projections.

12. The system as in claim 8, wherein the spring body retainer further comprises a spur gear.

13. The system as in claim 8, wherein the spring leg retainer further comprises a spur gear that is operably coupled to a complementary spur gear.

14. The system as in claim 8, wherein the biasing member is a helical torsion and compression combination spring.

15. A method of assembling a system, comprising:
    coupling a motor to a spring body retainer;
    coupling a biasing member to the spring body retainer;
    coupling a spring leg retainer to the biasing member and fixably connecting the biasing member to each of the spring body retainer and the spring leg retainer;
    coupling a spring locking plate to the spring leg retainer to form an assembly;
    inserting the assembly into a housing and preventing rotation of the spring locking plate;
    rotating each of the motor and the spring body retainer in a predefined rotation;
    preventing rotation of the spring leg retainer in a first direction; and
    rotating the spring leg retainer in a second direction, the second direction being opposite to the first direction, wherein rotation of the spring leg retainer in the second direction applies a preload torque to the biasing member.

16. The method as in claim 15, wherein a plurality of tabs of the spring locking plate prevent the rotation of the spring locking plate.

17. The method as in claim 15, further comprising fixably connecting each of a lower leg of the biasing member to the spring body retainer and an upper leg of the biasing member to the spring leg retainer.

18. The method as in claim 15, wherein a plurality of protrusions are located on the spring leg retainer and a plurality of blocking features of the spring locking plate are configured to engage at least one of the plurality of protrusions.

19. The method as in claim 15, further comprising rotating the spring body retainer by engaging a first spur gear formed on the spring body retainer.

20. The method as in claim 19, further comprising rotating the spring leg retainer by engaging a second spur gear of the spring leg retainer.

\* \* \* \* \*